(12) United States Patent
Akashi et al.

(10) Patent No.: US 9,944,254 B2
(45) Date of Patent: Apr. 17, 2018

(54) SUPPORT STRUCTURE FOR FRONT WIPER DEVICE FOR VEHICLE

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki-shi, Aichi (JP)

(72) Inventors: Tatsuya Akashi, Chonburi (TH); Hiroshi Amano, Okazaki (JP); Ryota Yasui, Okazaki (JP); Takeshi Araki, Okazaki (JP); Satoru Hara, Obu (JP); Tomoaki Nishiyama, Okazaki (JP); Takanobu Toritani, Okazaki (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Okazaki-Shi (JP)

( * ) Notice: Subject to any disclaimer, the term of this patent is extended or adjusted under 35 U.S.C. 154(b) by 630 days.

(21) Appl. No.: 14/397,132

(22) PCT Filed: Mar. 21, 2013

(86) PCT No.: PCT/JP2013/058062
§ 371 (c)(1),
(2) Date: Oct. 24, 2014

(87) PCT Pub. No.: WO2013/161459
PCT Pub. Date: Oct. 31, 2013

(65) Prior Publication Data
US 2015/0135461 A1 May 21, 2015

(30) Foreign Application Priority Data
Apr. 25, 2012 (JP) .................................. 2012-099837

(51) Int. Cl.
*B60S 1/16* (2006.01)
*B60S 1/06* (2006.01)
*B60S 1/04* (2006.01)

(52) U.S. Cl.
CPC ........... *B60S 1/0458* (2013.01); *B60S 1/0433* (2013.01); *B60S 1/0463* (2013.01); *B60S 1/0472* (2013.01)

(58) Field of Classification Search
CPC .... B60S 1/0458; B60S 1/0433; B60S 1/0463; B60S 1/0472; B60S 1/0491; B60S 1/0436;
(Continued)

(56) References Cited

U.S. PATENT DOCUMENTS 6,718,592 B2 * 4/2004 Ohashi ................. B60S 1/0425
15/250.3
2004/0034959 A1 2/2004 Nakamura
(Continued)

FOREIGN PATENT DOCUMENTS

DE 102006049271 * 4/2008
JP 2000-85541 A 3/2000
(Continued)

OTHER PUBLICATIONS

Machine language translation of description portion of JP 2007223561, published Sep. 2007.*
(Continued)

*Primary Examiner* — Gary Graham
(74) *Attorney, Agent, or Firm* — Birch, Stewart, Kolasch & Birch, LLP

(57) ABSTRACT

A support structure for a front wiper device for a vehicle having an annular pivot cap which surrounds, under a deck garnish, a periphery of a pivot on which a base end portion of a wiper arm is supported is provided. The pivot cap
(Continued)

includes a bottom plate section that is in an annular shape surrounding the periphery of the pivot, and is extended to a vehicle front side, and a flange section extending upward from an edge portion of the bottom plate section. The flange section is opened at a vehicle front side, and is provided with an opening. In a region at a vehicle rear side and at an electric motor side, of the bottom plate section, a protrusion that protrudes upward from a region at a side opposite to the electric motor is included.

8 Claims, 7 Drawing Sheets

(58) Field of Classification Search
CPC ........ B60S 1/0413; B60S 1/16; B65D 25/081; B60R 13/07
USPC ...... 15/250.3, 250.31; 296/96.15, 96.17, 192
See application file for complete search history.

(56) References Cited

U.S. PATENT DOCUMENTS

| | | |
|---|---|---|
| 2005/0097700 A1 | 5/2005 | Iwata |
| 2006/0005341 A1 | 1/2006 | Lee |

FOREIGN PATENT DOCUMENTS

| | | | |
|---|---|---|---|
| JP | 2005-145093 A | | 6/2005 |
| JP | 2007-223561 | * | 9/2007 |
| JP | 2007-245809 A | | 9/2007 |

OTHER PUBLICATIONS

Extended European Search Report issued in Application No. EP 13782535.2 dated Nov. 17, 2015.

* cited by examiner

SECTION ALONG LINE B - B

SUPPORT STRUCTURE FOR FRONT WIPER DEVICE FOR VEHICLE

TECHNICAL FIELD

The present invention relates to an art of controlling water drain in a support section of a front wiper for a vehicle.

BACKGROUND ART

The front wiper device for a vehicle is configured in such a manner that a wiper arm is fixed to a pivot that is reciprocally rotated by a drive source such as an electric motor and the wiper arm is reciprocated via the pivot by the electric motor or the like to wipe the surface of a windshield. For example, two pivots are provided correspondingly to the number of wiper arms, each of the pivots penetrates through a deck garnish connecting to the front end portion of the windshield and is connected by a link or the like at a lower portion of the deck garnish, and the link is rotationally driven by an electric motor disposed under the deck garnish.

Further, there is proposed an art of trapping water that passes through a gap between a pivot and a deck garnish by providing a bowl-shaped pivot cap on the outer periphery of the pivot, in order to prevent water drops of rainwater or the like that reach the deck garnish along the windshield from passing through the gap between the pivot and the deck garnish and penetrating into an electric motor disposed under the deck garnish (see Patent Document 1).

PRIOR ART DOCUMENT

Patent Document

Patent Document 1: Japanese Patent Laid-Open No. 2000-85541

SUMMARY OF THE INVENTION

Problems to be Solved by the Invention

When a pivot cap is provided as in Patent Document 1, the water trapped onto the pivot cap needs to be drained. In Patent Document 1, a drainage hole is provided in an outer peripheral portion of the pivot cap so as to guide water to a position separated in an outer circumferential direction from the pivot.

However, since the electric motor drives the pivot via a link member as described above, the electric motor is not disposed directly under the pivot, but in a position separated sideway in most cases.

Accordingly, there is the fear that the water discharged sideway from the drainage hole in the outer peripheral portion of the pivot cap is poured onto the electric motor. In particular, at the time of vehicle traveling, the water discharged from the pivot cap is easily scattered due to vibration or the like, and there is a high possibility that the water reaches the electric motor.

The present invention is made to solve the problem as above, and an object of the present invention is to provide a support structure for a front wiper device for a vehicle capable of stable water drain so that water does not reach an electric motor from a pivot cap.

Means for Solving the Problems

In order to achieve the above object, the invention according to claim 1 is directed to a support structure for a front wiper device for a vehicle in which a pivot is inserted through a hole provided in a deck garnish, a base end portion of a wiper arm is supported on an upper portion of the pivot, a lower portion of the pivot is drivable reciprocally and rotationally by an electric motor, and the electric motor is disposed under the deck garnish by being separated in a vehicle lateral direction from the pivot, and the support structure has a pivot cap surrounding a periphery of the pivot under the deck garnish, wherein the pivot cap includes a bottom plate section that is disposed in the periphery of the pivot and is extended to any one side in a vehicle longitudinal direction, and a flange section that extends upward from an edge portion of the bottom plate section to surround a peripheral edge of the bottom plate section, in a region of the flange section at a side where the bottom plate section is extended, a part of the flange section is opened and an opening from which water on the pivot cap is drained is provided, and in a region of the bottom plate section, at a side opposite to the extended side in the vehicle longitudinal direction and at the electric motor side in the vehicle lateral direction, a protrusion that protrudes upward from a region at a side opposite to the electric motor in the vehicle lateral direction is included.

In the invention according to claim 2, the opening is formed to open in such a manner that a side opposite to the electric motor in the vehicle lateral direction is opened more widely than the electric motor side.

In the invention according to claim 3, two of the pivots are provided by being separated in the vehicle lateral direction, the electric motor is disposed between the two pivots, and is capable of driving the two pivots reciprocally and rotationally via a link, and protrusions of the two pivot caps are respectively disposed in regions at inner sides in the vehicle lateral direction, of the bottom plate sections.

In the invention according to claim 4, a groove that extends in a vertical direction is provided in the flange section at a vehicle rear side of the pivot cap.

Advantageous Effects of the Invention

According to the invention of claim 1, water such as rainwater that passes through the hole, namely, the gap between the pivot and the deck garnish from the deck garnish and drops onto the bottom plate of the pivot cap is drained from the opening that is provided in the region which is extended to any one side in the vehicle longitudinal direction. At this time, the water which drops onto the protrusion flows to the region which is lower than the protrusion and at the side opposite to the electric motor, because the protrusion that protrudes upward from the region at the side opposite to the electric motor is included at the region of the bottom plate section at the side opposite to the opening and at the electric motor side.

As a result, the water flows on the bottom plate from the electric motor side to the side opposite thereto, and is drained in the direction separated from the electric motor from the opening which is separated to any one side in the vehicle longitudinal direction with respect to the pivot. Accordingly, stable drainage that prevents water from reaching the electric motor is enabled, and the electric motor can be protected.

According to the invention of claim 2, the opening is opened in such a manner as to open more widely to the side opposite to the electric motor than the electric motor side. Therefore, more water can be drained from the opening at the position separated from the electric motor, and arrival of the water at the electric motor can be further restrained.

According to the invention of claim 3, in the front wiper device for a vehicle which drives the two pivots provided to be separated in the vehicle lateral direction by the electric motor disposed between the pivots via the link, the protrusions of the two pivot caps are disposed in the regions at the inner sides in the vehicle lateral direction, of the bottom plate sections respectively. Therefore, in both thereof, the protrusions are disposed at the electric motor side, whereby both of the two pivot caps have the structures that drain water toward the side opposite to the electric motor. As a result, in the front wiper device for a vehicle that drives the two wiper arms with the one electric motor, the support structure for the front wiper device which restrains arrival of water at the electric motor can be provided.

According to the invention of claim 4, while the strength of the pivot cap is increased by the pivot cap having the flange section, increase in the strength of the pivot cap can be restrained by the groove being provided in the flange section. In particular, since the groove is provided to extend in the vertical direction, stress easily concentrates on the groove, and the strength of the pivot cap can be effectively reduced.

Thereby, when a pedestrian rides on the deck garnish when the vehicle collides with the pedestrian, for example, an impact to the pedestrian can be restrained, because the strength of the support section of the front wiper device is reduced.

MODE FOR CARRYING OUT THE INVENTION

Hereinafter, an embodiment of the present invention will be described based on the drawings.

Figure 1:
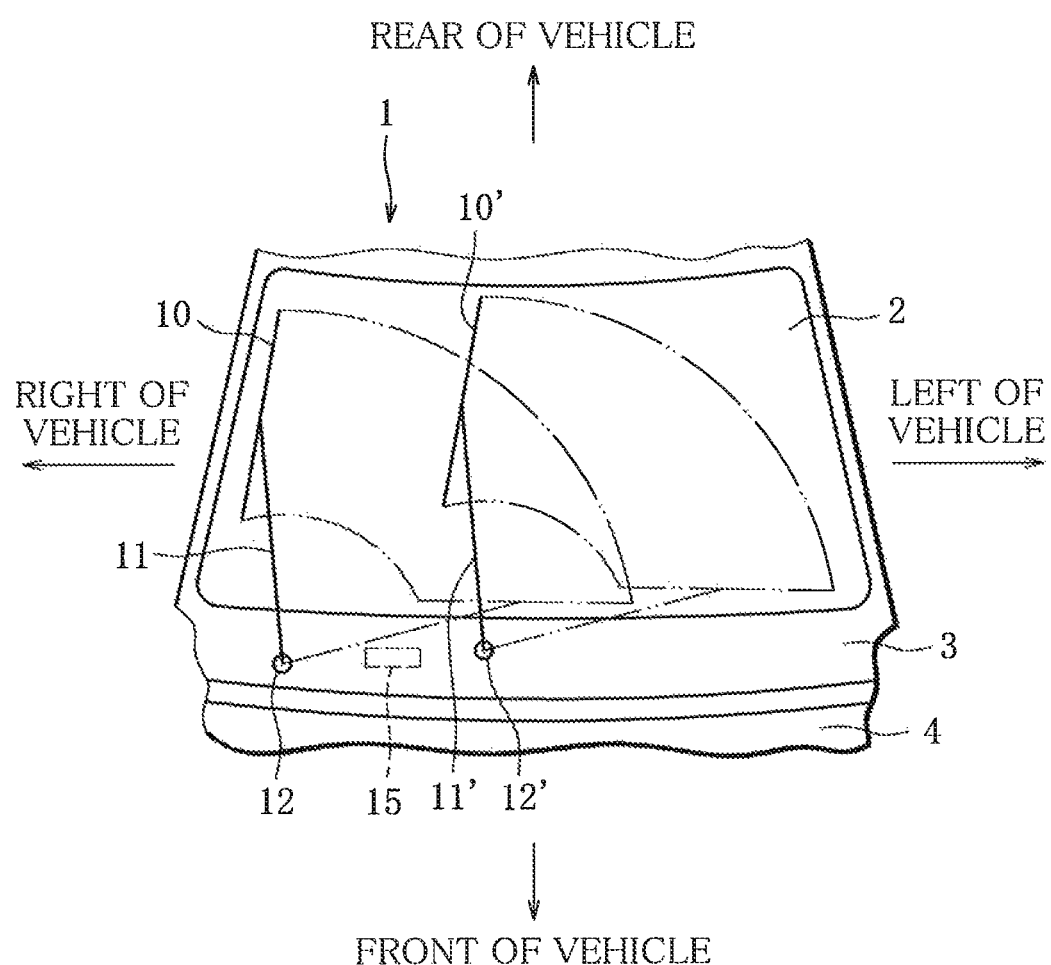
FIG. 1 is a perspective view showing an outside shape of a front of a vehicle according to an embodiment of the present invention.
Figure 2:
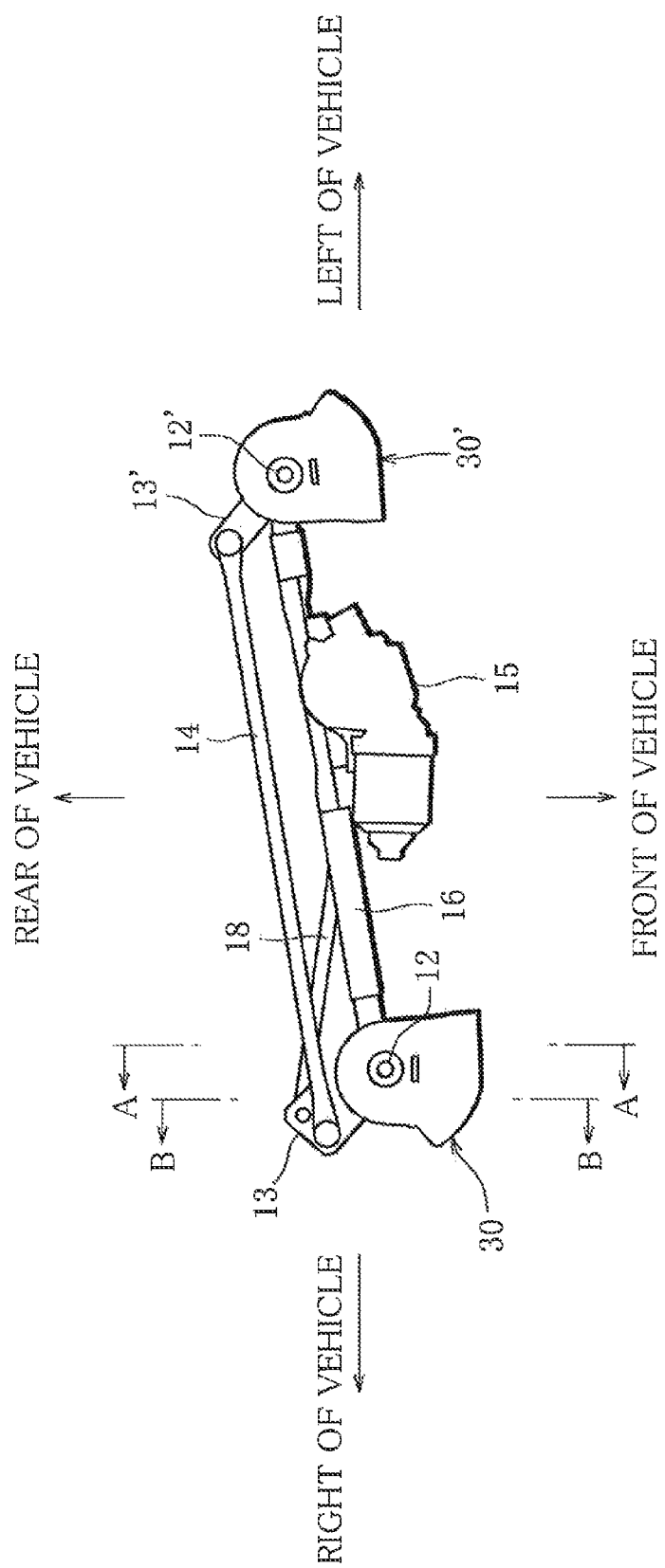
FIG. 2 is a top view showing a structure of a drive section of a front wiper device.
Figure 3:
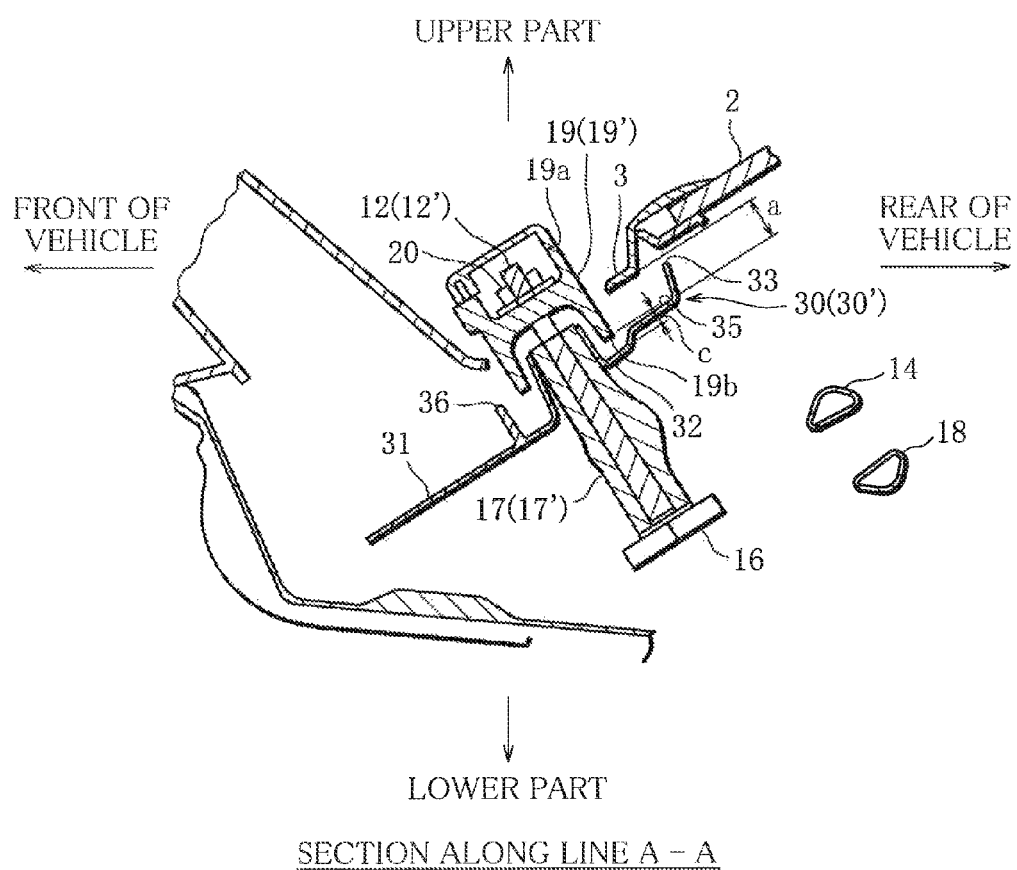
FIG. 3 is a vertical sectional view showing a structure of a support section of the front wiper device.
Figure 4:
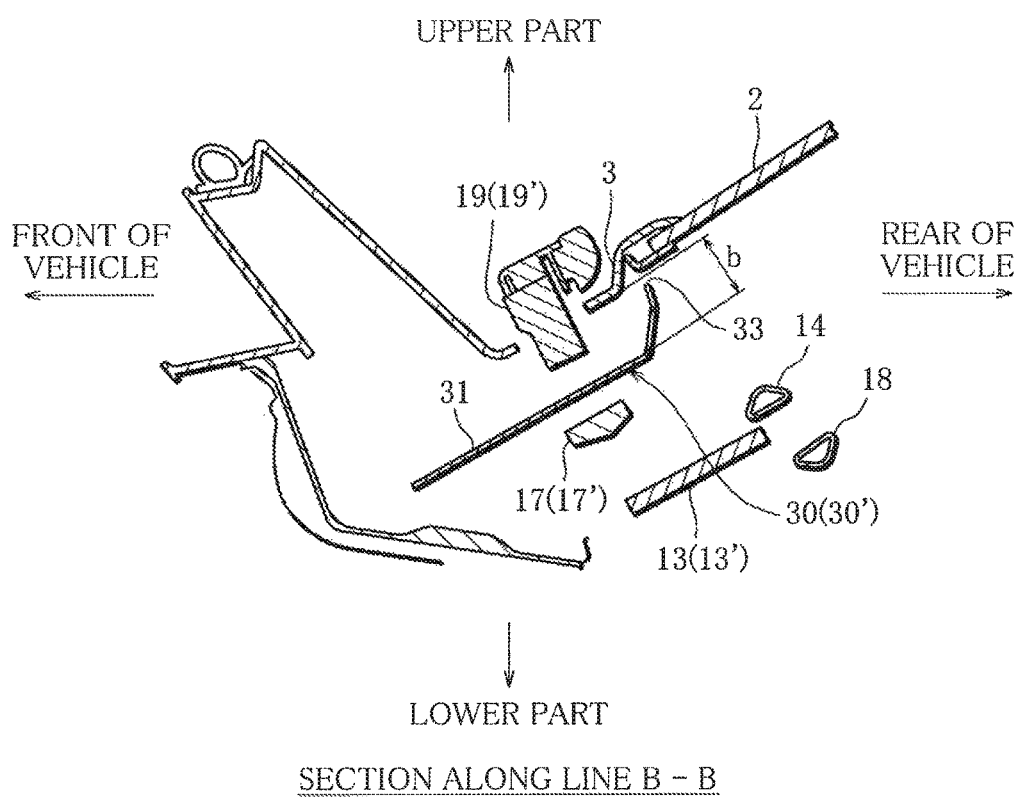
FIG. 4 is a vertical sectional view showing the structure of the support section of the front wiper device.

FIG. 1 is a perspective view showing an outside shape of a front of a vehicle 1 according to the embodiment of the present invention. FIG. 2 is a top view showing a structure of a drive section of a front wiper device. FIG. 3 and FIG. 4 are vertical sectional views each showing a structure of a support section of the front wiper device. FIG. 3 shows a section cut along a vehicle longitudinal direction at a position that is offset to an electric motor side from an axis of a pivot, and FIG. 4 shows a section cut along the vehicle longitudinal direction at a position that is offset to a side opposite to the electric motor from the axis of the pivot.

As shown in FIG. 1, a deck garnish 3 is provided at a lower end of a windshield 2 of the vehicle 1. The deck garnish 3 is a cover member that is provided between the windshield 2 and a front hood 4, and is formed from a resin, for example, and is formed to extend to a substantially full width of a vehicle body to be fixed to the vehicle body. The deck garnish 3 has a structure which covers a rear top surface of an engine room at a rear side of the front hood 4, and has a front end portion of the windshield 2 fitted into a groove provided in a rear end portion to support the windshield 2 throughout a full range in a vehicle width direction.

The vehicle 1 includes two wipers 10 and 10' for the windshield 2. The two wipers 10 and 10' are respectively supported by distal ends of wiper arms 11 and 11', and base portions of the wiper arms 11 and 11' are respectively fixed to pivots 12 and 12' that protrude upward from the deck garnish 3 with a space from each other in a vehicle lateral direction.

As shown in FIG. 2, brackets 13 and 13' that extend rightward to the rear of the vehicle are respectively provided at lower portions of the left and right pivots 12 and 12', and distal end portions of the two brackets 13 and 13' are connected by a link member 14 disposed under the deck garnish 3. Further, an electric motor 15 is mounted under the deck garnish 3. The electric motor 15 is fixed to a stay 16 that extends between the pivots 12 and 12'. The stay 16 connects bearings 17 and 17' that rotatably support the pivots 12 and 12', and is fixed to the vehicle body. An output shaft of the electric motor 15 and a distal end portion of the bracket 13 at one side are connected by a link member 18 to be configured to oscillate the bracket 13 at one side in the lateral direction via the link member 18 by rotation of the electric motor 15. By lateral oscillation of the bracket 13 at one side, the bracket 13' at the other side is also laterally oscillated synchronously via the link member 14. Accordingly, The two wiper arms 11 and 11' are configured to be laterally oscillated by rotation of the output shaft of the electric motor 15.

As shown in FIGS. 3 and 4, wiper arm heads 19 and 19' that are base end portions of the wiper arms 11 and 11' are inserted in upper end portions of the pivots 12 and 12' and fixed thereto by being fastened by nuts 20. The wiper arm heads 19 and 19' are formed to be substantially circular in top view, and H-shaped in vertical section. In outer peripheral portions of the wiper arm heads 19 and 19', upper end portions 19a protrude upward from the deck garnish 3, and lower end portions 19b extend downward from the deck garnish 3, and protrude downward at outside from upper end portions of the bearings 17 and 17'.

Further, pivot caps 30 and 30' are fitted on and fixed to the bearings 17 and 17' under the wiper arm heads 19 and 19'. The pivot caps 30 and 30' have holes 32 in which the bearings 17 and 17' are inserted, in substantially central portions of bottom plate sections 31 in sector shapes in top view, and outer peripheral portions are protruded upward to form flange sections 33.

Accordingly, although there is a fear that water such as rainwater that flows onto the deck garnish 3 along the windshield 2 and the like passes through gaps between the wiper arm heads 19 and 19' and the deck garnish 3, and penetrates downward from the deck garnish 3, the pivot caps 30 and 30' receive the rainwater or the like to prevent the rainwater or the like from dropping downward therefrom.

Figure 5:
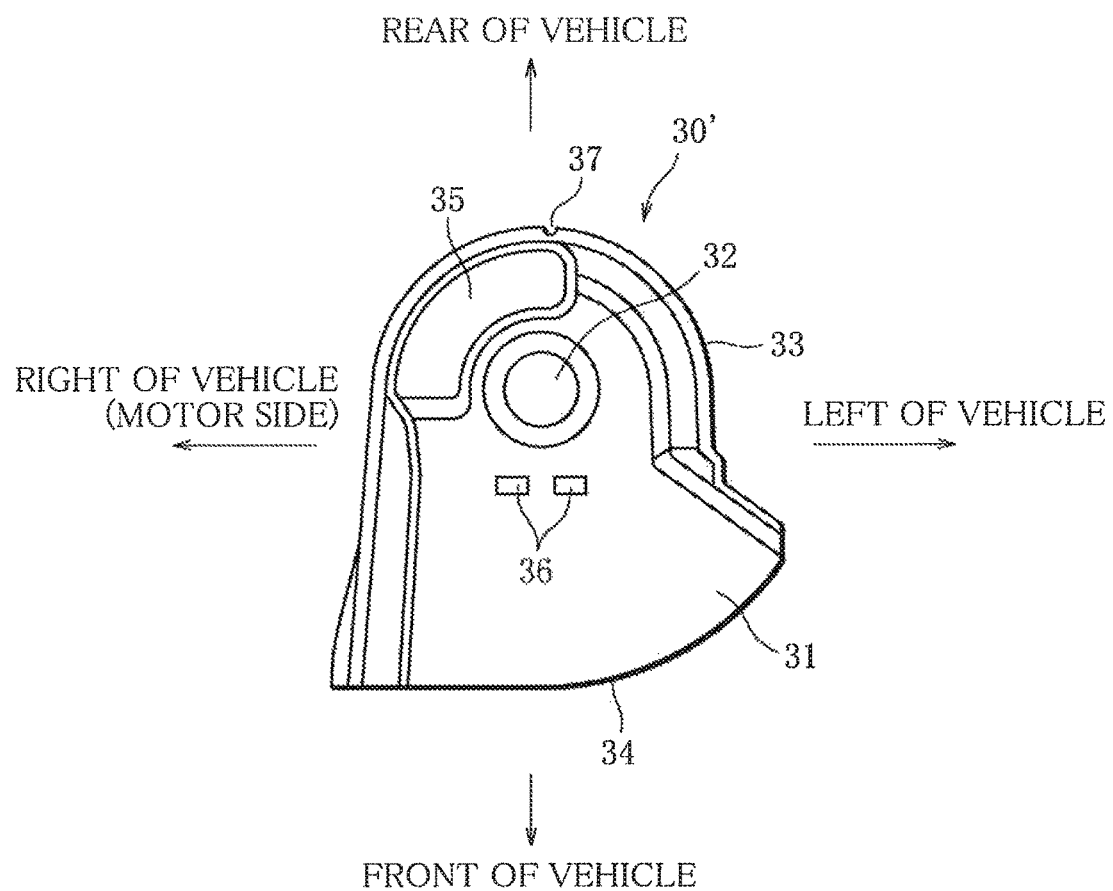
FIG. 5 is a top view showing a shape of a pivot cap at a left side of the vehicle.
Figure 6:
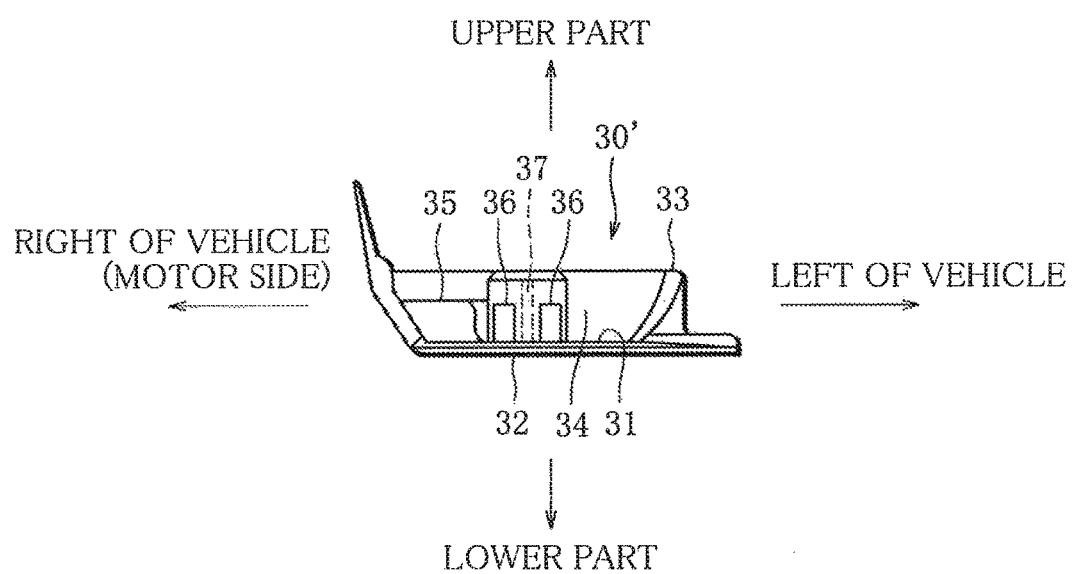
FIG. 6 is a front side view showing the shape of the pivot cap at the left side of the vehicle.
Figure 7:
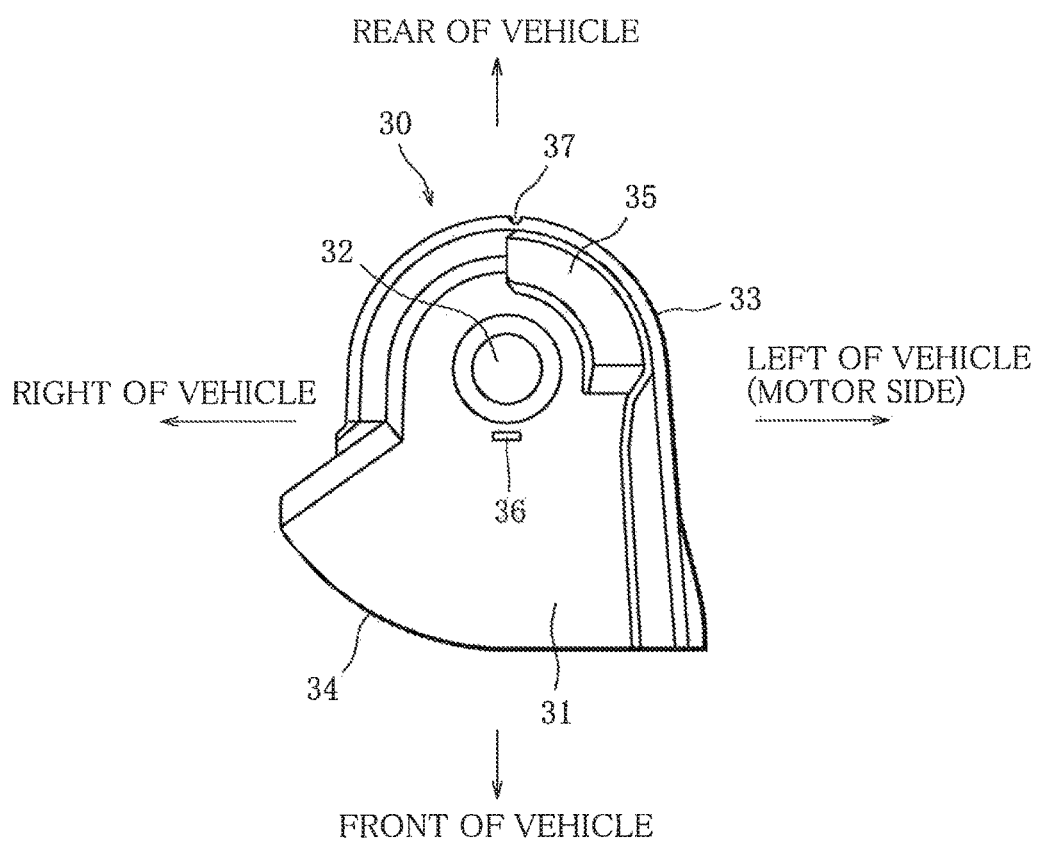
FIG. 7 is a top view showing a shape of the pivot cap at a right side of the vehicle.

FIG. 5 is a top view showing a shape of the pivot cap 30' at a left side of the vehicle. FIG. 6 is a side view seen from a front of the vehicle, which shows the shape of the pivot cap 30' at the left side of the vehicle. FIG. 7 is a top view showing a shape of the pivot cap 30 at a right side of the vehicle.

The present embodiment has a feature in the shapes of the pivot caps 30 and 30' in order to control water drain from the pivot caps 30 and 30'.

The pivot caps 30 and 30' are disposed to be in sector shapes with vehicle front sides thereof opened in a state in which the pivot caps 30 and 30' are attached to a vehicle. Note that the pivot cap 30 at the right side of the vehicle and the pivot cap 30' at the left side of the vehicle are formed to be substantially symmetrical laterally.

As shown in FIGS. 5 to 7, in the flange sections 33 of the pivot caps 30 and 30', portions corresponding to the front sides of the vehicle are not formed, that is, in the flange sections 33, regions at the front sides of the vehicle are opened, and openings 34 are provided. The bottom plate sections 31 of the pivot caps 30 and 30' are provided to extend to the front side of the vehicle, and are disposed to be inclined so that vehicle front sides are located at a position lower than vehicle rear sides.

Accordingly, rainwater and the like that drop on the pivot caps 30 and 30' move to the vehicle front side along the bottom plate sections 31, and are drained from the openings 34 at the front ends. In particular, the flange sections 33 at the electric motor 15 side extend to end portions at the vehicle front side, whereas the sides opposite to the electric motor 15 only extend to the vehicle rear position from the electric motor 15 sides. Further, the openings 34 at the front ends of the pivot caps 30 and 30' are also disposed to open more widely to the sides opposite to the electric motor 15 than to the electric motor 15 sides. Thereby, when rainwater and the like are drained from the openings 34 at the vehicle front side from the pivot caps 30 and 30', the rainwater and the like are discharged more to the side opposite to the electric motor 15 than to the electric motor 15 side.

Further, the bottom plate sections 31 of the pivot caps 30 and 30' are protruded upward at positions at the vehicle rear sides and at the electric motor 15 sides in the vehicle lateral direction, and are provided with protrusions 35. Thereby, rainwater and the like that drop on the positions at the vehicle rear sides on the pivot caps 30 and 30' easily flow from the electric motor 15 sides to the opposite sides that are lower than the electric motor 15 sides in the vehicle lateral direction when rainwater and the like flow to the openings 3 at the vehicle front side. Thereby, rainwater and the like that drop onto the pivot caps 30 and 30' are drained more to the sides opposite to the electric motor 15 from the electric motor 15 sides.

Further, heights of the bottom plate sections 31 at the vehicle rear sides of the pivot caps 30 and 30' are made larger at the electric motor 15 sides than heights at the sides opposite thereto, whereby distances between the deck garnish 3 and the bottom plate sections 31 of the pivot caps 30 and 30' also become smaller at the electric motor 15 sides (a in FIG. 3) than those at the sides opposite thereto (b in FIG. 4). Accordingly, when a large amount of rainwater and the like drop onto the pivot caps 30 and 30', flow amounts of the rainwater and the like flowing at the electric motor 15 sides can be restrained more than flow amounts of the rainwater and the like flowing at the sides opposite to the electric motor 15.

Further, the flange sections 33 of the pivot caps 30 and 30' extend upward to positions that are as close to the deck garnish 3 as possible. Thereby, rainwater and the like that flow onto the pivot caps 30 and 30' can be made to hardly ride over the flange sections 33 and flow out to the vehicle rear sides and the electric motor 15 sides.

From the above, rainwater and the like that drop onto the pivot caps 30 and 30' are drained in the direction to avoid the electric motor 15, and rainwater and the like can be restrained from reaching the electric motor 15. Thereby, it is not necessary to provide a rain deflector around the electric motor 15, and enhance waterproofness of the electric motor 15, and the component cost can be reduced.

Further, the heights of the bottom plate sections 31 at the vehicle rear sides, of the pivot caps 30 and 30' are increased at the electric motor 15 sides, whereby gaps (c in FIG. 3) between the wiper arm head 19 and 19' and the bottom plate sections 31 of the pivot caps 30 and 30' also can be decreased, penetration of rainwater and the like that flow onto the pivot caps 30 and 30' into the bearing sections 17 and 17' is prevented, the bearing sections 17 and 17' are protected, and leakage of rainwater and the like downward of the pivot caps 30 and 30' also can be restrained.

Further, in the bottom plate sections 31 of the pivot caps 30 and 30', projecting sections 36 that project upward are provided at vehicle front sides of the holes 32 in which the pivots 12 are inserted. The projecting section 36 has a function of receiving a wood chip and the like to restrain the wood chip and the like from flowing downward when the long and thin wood chip and the like enter the gap between the wiper arm head 19 and the deck garnish 3 together with rainwater or the like. Note that while in the present embodiment, the pivot cap 30 is provided with one projecting section 36, and the pivot cap 30' is provided with two of the projecting sections 36, the number of the projecting sections 36 and the size thereof can be properly set.

Note that the pivot caps 30 and 30' are preferably extended forward of the vehicle as much as possible. By extending the vehicle front sides of the pivot caps 30 and 30' like this, the drain position of rainwater and the like can be separated farther away from the electric motor 15. Further, the passage distance until rainwater or the like is drained after the rainwater or the like drops onto the pivot caps 30 and 30' is made long, and thereby a flow speed and spatter of rainwater or the like can be reduced. Thereby, even if vibration or the like is applied while vehicle is traveling, for example, rainwater or the like can be further restrained from reaching the electric motor 15.

Further, a groove 37 can be provided in an end portion at a vehicle rear side of each of the pivot caps 30 and 30'. The groove 37 is disposed to extend vertically in accordance with a position of an end portion of the protrusion 35. Entire strength of the pivot caps 30 and 30' is increased since the flange sections 33 extend upward as described above, and by providing the grooves 37, the pivot caps 30 and 30' can be easily broken at the positions of the grooves 37. Accordingly, the strength in the mounting portion of the front wiper device can be reduced, and when a pedestrian rides on the front hood 4 and collides with the deck garnish 3 in the event of a front collision to the pedestrian, an impact to the pedestrian is restrained, and safety for the pedestrian can be enhanced.

Note that the invention of the present application is not limited to the above described embodiment. For example, when the bottom plate sections 31 of the pivot caps 30 and 30' are extended to the vehicle rear side, and the openings 34 are provided in regions at the vehicle rear sides of the flange sections 33, the protrusions 35 can be provided on top surfaces at the vehicle front sides from the pivots 12 and at the electric motor 15 sides, of the bottom plate sections 31.

Further, while in the above described embodiment, the invention of the present application is applied to the vehicle including the two wiper arms 11 and 11', the invention of the present application also can be similarly applied to the vehicle having one or a plurality of wiper arms.

EXPLANATION OF REFERENCE SIGNS

1 VEHICLE
3 DECK GARNISH 11, 11' WIPER ARM
12, 12' PIVOT
15 ELECTRIC MOTOR
30, 30' PIVOT CAP
31 BOTTOM PLATE SECTION
33 FLANGE SECTION
34 OPENING
35 PROTRUSION
37 GROOVE

The invention claimed is:

1. A support structure for a front wiper device for a vehicle in which a pivot is inserted through a hole provided in a deck garnish, a base end portion of a wiper arm is supported on an upper portion of the pivot, a lower portion of the pivot is drivable reciprocally and rotationally by an electric motor, and the electric motor is disposed under the deck garnish by being separated in a vehicle lateral direction from the pivot, the support structure comprising:

a pivot cap surrounding a periphery of the pivot under the deck garnish, wherein the pivot cap comprises a bottom plate section that is disposed in the periphery of the pivot and is extended in a vehicle longitudinal direction, and a flange section that extends upward from an edge portion of the bottom plate section to surround a peripheral edge of the bottom plate section, in a region of the flange section at a side where the bottom plate section is extended, a part of the flange section is opened and an opening is provided from which water on the pivot cap is drained, and in a region of the bottom plate section, at a side opposite to the extended side and at the side facing the electric motor in the vehicle lateral direction, a protrusion is provided that protrudes upward from the bottom plate at a side facing the electric motor in the vehicle lateral direction, and wherein the bottom plate section defines an opening that supports the pivot, and the protrusion is provided between the opening and the motor.

2. The support structure for a front wiper device for a vehicle according to claim 1, wherein the opening is formed to open in such a manner that a side opposite to the electric motor in the vehicle lateral direction is opened more widely than the electric motor side.

3. The support structure for a front wiper device for a vehicle according to claim 2, wherein two of the pivots are provided by being separated in the vehicle lateral direction, the electric motor is disposed between the two pivots, and is capable of driving the two pivots reciprocally and rotationally via a link, and protrusions of the two pivot caps are respectively disposed in regions at inner sides in the vehicle lateral direction, of the bottom plate sections.

4. The support structure for a front wiper device for a vehicle according to claim 3, wherein a groove that extends in a vertical direction is provided in the flange section at a vehicle rear side of the pivot cap.

5. The support structure for a front wiper device for a vehicle according to claim 2, wherein a groove that extends in a vertical direction is provided in the flange section at a vehicle rear side of the pivot cap.

6. The support structure for a front wiper device for a vehicle according to claim 1, wherein two of the pivots are provided by being separated in the vehicle lateral direction, the electric motor is disposed between the two pivots, and is capable of driving the two pivots reciprocally and rotationally via a link, and protrusions of the two pivot caps are respectively disposed in regions at inner sides in the vehicle lateral direction, of the bottom plate sections.

7. The support structure for a front wiper device for a vehicle according to claim 6, wherein a groove that extends in a vertical direction is provided in the flange section at a vehicle rear side of the pivot cap.

8. The support structure for a front wiper device for a vehicle according to claim 1, wherein a groove that extends in a vertical direction is provided in the flange section at a vehicle rear side of the pivot cap.

* * * * *